June 30, 1964 P. J. COSTA ETAL 3,138,970
RATIO SENSITIVE CONTROL FOR LIMITED SLIP DIFFERENTIALS
Filed April 5, 1961 2 Sheets-Sheet 1
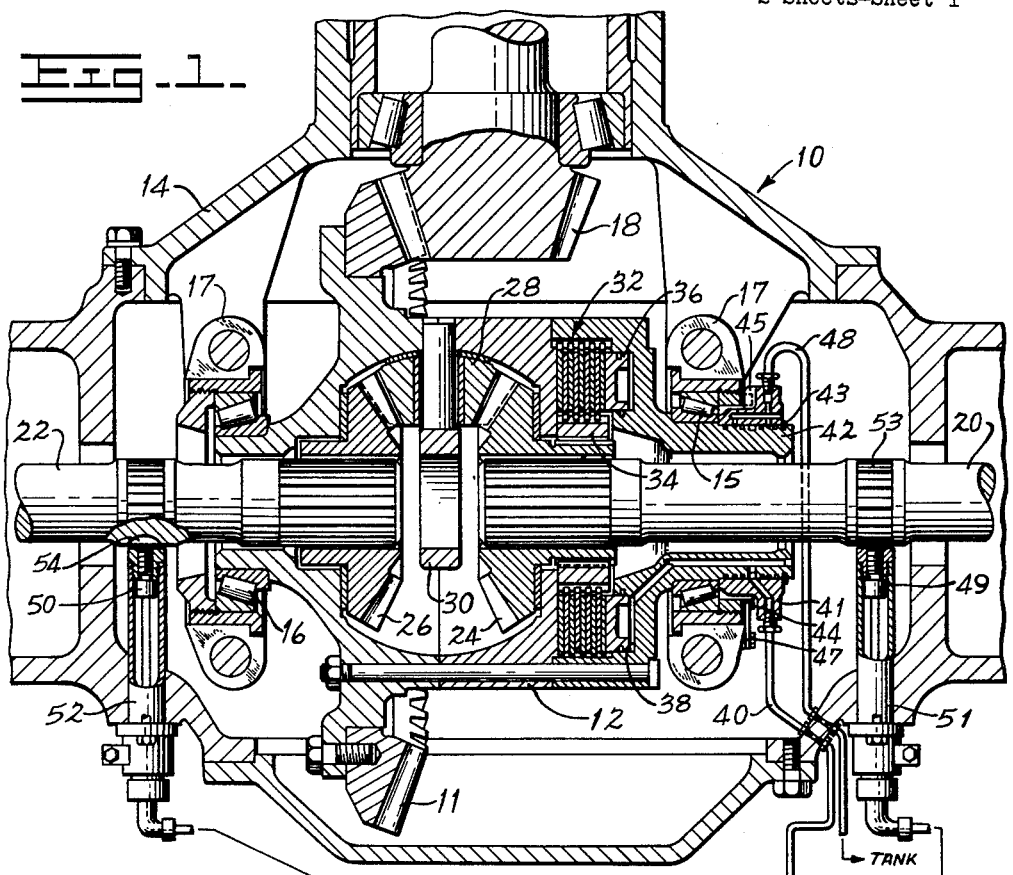
Fig. 1.
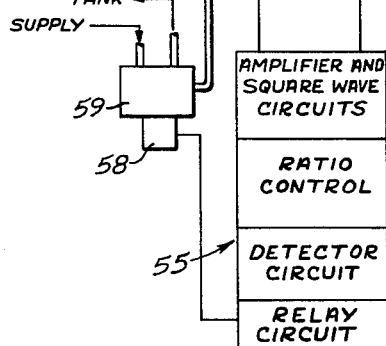
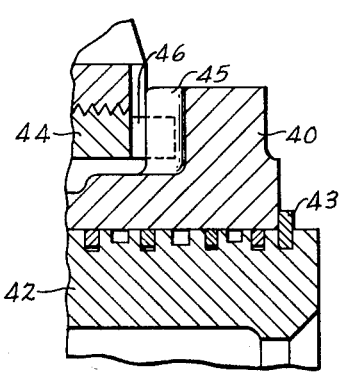
Fig. 3.
INVENTORS
PHILIP J. COSTA
HARRY H. BOWEN
BY JOHN H. BABBITT, JR.
ATTORNEYS

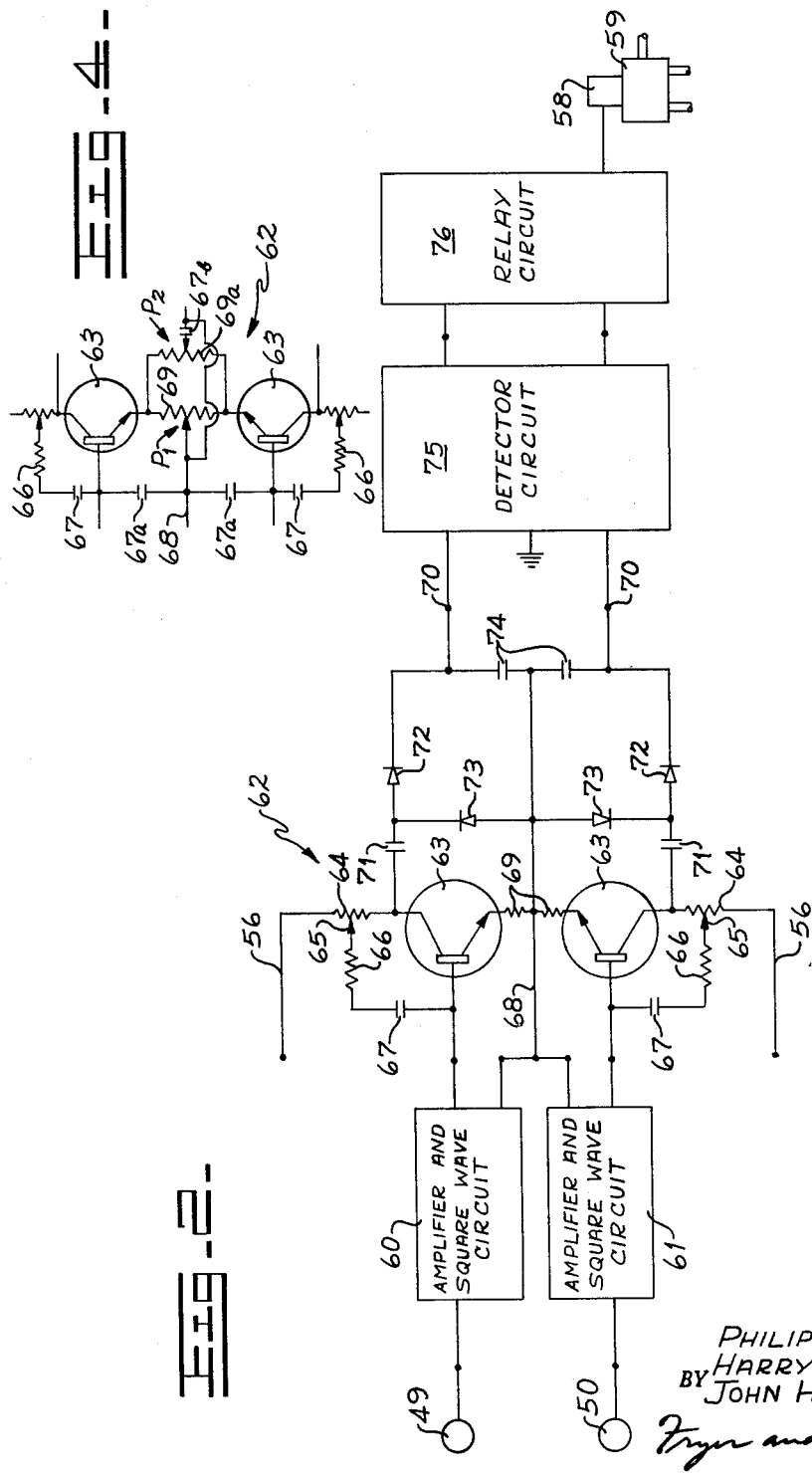

United States Patent Office 3,138,970
Patented June 30, 1964

3,138,970
RATIO SENSITIVE CONTROL FOR LIMITED SLIP DIFFERENTIALS
Philip J. Costa, Peoria, Harry H. Bowen, Pekin, and John H. Babbitt, Jr., Peoria, Ill., assignors to Caterpillar Tractor Co., Peoria, Ill., a corporation of California
Filed Apr. 5, 1961, Ser. No. 100,967
4 Claims. (Cl. 74—711)

The present invention relates to an improved limited slip differential and more particularly to a ratio sensitive electronic control to automatically sense the wheel speed ratio and hydraulically lock the differential any time a predetermined ratio is exceeded.

Mechanical differential means are commonly used between a pair of drive wheels on a vehicle in order that they may rotate at different speeds as is desirable when the vehicle is turning and the distance travelled by one wheel is necessarily greater than that of the other. This differential action, however, has one disadvantage in that should one of the wheels lose its traction, such as when it is mud or ice, that wheel will slip and run faster than the other wheel, therefore creating a tire wear problem and also limiting the torque output of the truck since the torque of the non-slipping wheel will equal only that required to turn the slipping wheel. In view of this, it is desirable to provide some means of selectively or automatically locking out this differential action as soon as the speed ratio of the two wheels exceeds the maximum attained during the sharpest turn which the vehicle will negotiate. Some vehicles are equipped with manually operated brake controls which enable the operator to apply a brake selectively to one or the other of the drive wheels and by applying the brake to a slipping wheel, its speed may be reduced to the point where the opposite wheel having good traction is compelled to drive the vehicle. This solution of the slipping problem requires attention of the operator and it is difficult to control the degree to which the brake on the slipping wheel should be applied in order to effect traction without causing the vehicle to stall. Automatic speed sensitive controls which are used for automatically locking out differential action are undesirable from the standpoint that regardless of the speed at which the wheels are rotating as soon as the speed of one wheel exceeds that of the other by a few r.p.m., the control will be actuated and the differential locked and will result in limiting the differential action necessary during high speed turns.

Accordingly, it is an object of this invention to provide means for automatically locking out differential action when a predetermined speed-ratio is exceeded between two wheels.

It is another object of this invention to provide electronic circuit means for determining the speed ratio at which differential action will be limited.

It is another object of this invention to provide an electronic integrating circuit having a variable ratio of input to output voltage.

Further and more specific objects and advantages of the invention are made apparent in the following specification wherein the invention is described in detail by reference to the accompanying drawings.

FIG. 1 is a cross section of the fluid locking differential of the present invention in conjunction with a schematic block diagram of the electronic control means for actuating the differential locking mechanism;

FIG. 2 is a combination schematic and block diagram of the electronic control means of the present invention;

FIG. 3 is an enlarged view of a portion of the mechanism shown in FIG. 1; and

FIG. 4 is a schematic diagram of an alternate embodiment of the control circuit of the present invention.

Referring now to FIG. 1 there is shown a bevel gear differential 10 having a ring gear 11 rigidly secured to a carrier member 12 rotatably journalled in a housing 14 by means of spaced apart bearings 15 and 16 which are secured in split support bearings 17. The differential is driven through a ring gear 11 by a bevel gear 18 which is connected by a shaft to the vehicle transmission (not shown). A pair of axle shafts 20 and 22, each having their outer ends connected to one of the ground engaging wheels, extend inwardly to where they project inside carrier 12 and are connected by a conventional spline arrangement to a pair of beveled side gears 24 and 26. A plurality of differential pinions 28 are journalled on a differential spider 30 which is secured in carrier 12 and provides the normal differential action when a vehicle is negotiating a turn.

A locking means is provided by a multiple disc clutch 32 having alternate discs secured in carrier 12 and the other discs secured to a clutch hub 34 non-rotatably connected such as by a spline on bevel side gear 24. An annular piston 36 is carried in an annular cavity 38 in carrier 12. Hydraulic fluid is supplied through a line 40 which is connected to a fluid conducting ring 41 rotatably retained on an axially extending hub portion 42 of carrier 12 by a snap ring 43 to provide a rotary joint through which hydraulic fluid is supplied to cavity 38. As shown in FIG. 3 ring 40 is keyed to a bearing adjusting nut 44 by a boss 45 engaging a notch 46 in nut 44 which is in turn locked against rotation by a key 47 bolted to bearing 17. A second line 48 drains the leakage back to the tank to prevent contamination of the differential lubricant by the hydraulic fluid.

The speed of shafts 20 and 22 is transformed into an electrical signal by transducers 49 and 50 respectively. Most advantageously used as transducers for the present invention are commercially available magnetic pickups, sometimes referred to as proximity pickups. Transducers 49 and 50 are supported in housing 14 by tube assemblies 51 and 52 respectively. When transducers 49 and 50 are magnetic pickups, tube assemblies 51 and 52 project inside of housing 14 in a manner such that the transducers are positioned adjacent an enlarged portion of shafts 20 and 22 which are provided with a series of splined teeth 53 and 54. The electrical output of transducers 49 and 50 are introduced to an electronic control circuit 55 which functions to energize a solenoid 58 and actuate a control valve 59 when the wheel speed ratio reaches a predetermined amount.

The output signals of transducers 49 and 50 are in the form of a sine wave, the amplitude and frequency of which increases with increased rotational speed of axles 20 and 22 respectively. Referring now to FIG. 2, amplifier and square wave circuits 60 and 61 are seen to receive the output signals from transducers 49 and 50, respectively. Amplifier and square wave circuits 60 and 61 amplify and transform, in a conventional manner, the variable frequency variable amplitude sine waves of transducers 49 and 50 into constant amplitude variable frequency square waves which are introduced to control circuit 62. The frequency of the square wave signal introduced to circuit 62 is proportional to the frequency of the sine waves introduced to the amplifier and square wave circuits from transducers 49 and 50. Since control circuit 62 is symmetrical about a common wire 68, like components on either side of common wire 68 are designated by like numerals. The output from each amplifier and square wave circuit 60 and 61 is introduced to one of the bases of transistors 63. The collector of transistor 63 is supplied with operating power from a source line 56 through a resistor 64 intermediate the source line and the collector and having a variable tap 65. Tap 65 is connected to the base of transistor 63 through a serially connected resistor 66 and capacitor 67. A feedback path is thereby formed between the collector and base of transistor 63 and the amount of feedback is determined by the position of variable tap 65. The emitter of transistor 63 is connected to the common wire 68 through an appropriate resistor 69. The collector of transistor 63 is further connected to an output terminal 70 through a coupling capacitor 71 which is in series connection with a rectifier 72. Rectifier 72 is oriented to allow conduction in the direction of output terminal 70 to which it is connected. A rectifier 73 is connected between the common ground line 68 and the connection point between capacitor 71 and rectifier 72 and is oriented to allow conduction in the direction of capacitor 71 and rectifier 72. Rectifiers 72 and 73 form a half wave doubling rectifier circuit and thereby render the output signal of circuit 62 in the form of D.C. voltage which is approximately two times the A.C.-R.M.S. value. Output terminal 70 of circuit 62 is further connected to common ground line 68 through a capacitor 74 which reduces the ripple of the rectified voltage.

In operation, constant magnitude square waves having frequencies proportional to the rotational speed of the axle from which the signal is generated are imposed at the base of transistors 63. The signal from one axle is imposed upon the transistor above the line 68 and the other signal on the transistor below the line. The transistor 63 and feedback path of resistors 64, 66 and capacitor 67 form an integrating circuit which presents at the collector of transistor 63 a signal which approximates the integral of the signal at the base. The integral of a square wave is a triangle wave which is the form of the electrical signal at the collector of transistor 63.

The part of the signal at the collector which is fed back to the base is rendered out of phase with the base signal by capacitor 67 and therefore opposes the base signal. As the frequency of the input signal to the base of transistor 63 from the amplifier and square wave circuit increases, the amount of signal fed back through capacitor 67 increases (capacitors are lower impedance to high frequency than low frequency) and thus the opposition to the input signal will be greater. In this manner the signal at the collector is inversely proportional to the wheel speed to be controlled. The signal at the collector is passed through the half wave doubling rectifier circuit formed by rectifiers 72, 73 and thereby becomes a D.C. signal the magnitude of which is an inverse function of wheel speed.

The outputs at terminals 70 from circuit 62 are introduced to a detector circuit 75 which is activated upon the occurrence of a predetermined mismatch between the magnitudes of the signals at terminals 70. Numerous conventional circuits for performing the above described detector function are available, any of which are suitable. When the detector circuit 75 is activated, its output is introduced to a relay circuit 76 which becomes energized thereby. The energization of relay circuit 76 provides a current to the solenoid 58 of valve 59. When solenoid 58 receives current control valve 59 will be repositioned to admit pressure to the clutch cavity 38 through line 40 and lock carrier 12 to side gear 24 and prevent any further differential action.

The position of variable tap 65 determines the amount of output which is inversely fed back to the base of transistor 63 at a given frequency and therefore determines what the magnitude of the difference in voltage at terminals 70 will be for a given difference in axle or wheel speeds. Thus, the desired ratio of axle speeds at which differential limiting action will occur is determined by the position of variable tap 65.

Referring now to FIG. 4, capacitors 67a are provided between common line 68 and the base of transistors 63 to insure linearity of operation for high wheel speed operation. The inclusion of capacitors 67a becomes desirable when the vehicle operation gives rise to wheel speeds which produce feedback voltages at frequencies which render the impedance of capacitor 67 less than that of resistor 66. When this condition exists, capacitor 67 is no longer able to furnish the necessary phase shift. Capacitor 67a supplements capacitor 67 and high frequency operation is thereby insured.

A pair of potentiometers $P_1$, $P_2$ connected in parallel are electrically connected between the emitters of transistors 63 and common line 68. This arrangement allows compensation of the circuit for differences in transistor outputs which are due to the different values of like components on either side of line 68. A difference in like components is to be expected since manufacturers ratings are generally only specified within 10% tolerances. Since the difference in transistor output is an essential element in the present invention it is most advantageous to provide means for eliminating transistor output differences caused by means other than wheel speed. With this embodiment of control circuit 62, should the gain of one of transistors 63 exceed that of the other throughout the entire frequency range, movement of the sliders of potentiometers $P_1$ and $P_2$ along their resistors 69 and 69a away from the transistor indicating the higher gain increases the degeneration of the signal at the emitter of that transistor and as a result equalizes or matches the outputs from transistors 63.

Potentiometer $P_1$ is effective to match the output of the transistors for the low frequency range and potentiometer $P_2$ is effective to match the transistor outputs for the higher frequency range. This condition is achieved by supplying a capacitor 67b which is electrically connected between line 68 and the swinger arm of potentiometer $P_2$. Potentiometer $P_2$ thus becomes more sensitive to the higher frequencies as the impedance of capacitor 67b decreases when the frequency increases.

The following is a set of values of components for circuit 62 which might be used where the desired speed ratio is 1:1.5 and the voltage difference necessary to actuate circuit 75 is 1 volt D.C.:

| | |
|---|---|
| Transistor 63 | 9 to 20 beta gains. |
| Resistor 64 | 10,000 ohms. |
| Resistor 66 | 15,000 ohms. |
| Resistor 69 | 5,000 ohms. |
| Resistor 69a | 10,000 ohms. |
| Capacitor 67 | 2 microfarads. |
| Capacitor 67a | 1 microfarad. |
| Capacitor 67b | 10 microfarads. |
| Capacitor 71 | 25 microfarads. |
| Capacitor 74 | 25 microfarads. |
| Rectifier 72 | 1N2070 TI (Texas Instrument). |
| Rectifier 73 | 1N2070 TI (Texas Instrument). |
| Transistor 63 | 2N339 TI (Texas Instrument). |
| Supply voltage | 30 volts. |

Although the present invention has been described with respect to a single preferred embodiment it will be appreciated that numerous variations and modifications thereof are possible within the spirit and scope of the invention. It is thus not intended to limit the present invention to the detailed illustration described but instead attention is directed to the following claims for a precise definition of the invention.

We claim:
1. A system for controlling slip of a pair of wheels driven through differential gearing having a fluid actuated clutch for limiting differential action comprising magnetic pickups disposed to transduce the speed of each wheel to electrical energies, electrical means for transforming the electrical energies from said magnetic pickups to electrical energies in the form of constant amplitude square waves of frequencies proportional to said wheel speeds, electrical circuit means for transforming said square waves to direct current potentials which are inverse functions of said fre- quencies of said square waves, and means operable automatically upon said direct current potentials differing by a predetermined amount for actuating said fluid actuated clutch.

2. An electronic control circuit for producing a direct current output potential the magnitude of which is an inverse function of the frequency of a constant amplitude input signal comprising a transistor having a base, an emitter and a collector, a resistor connecting said emitter to a ground potential, an input terminal for applying a constant amplitude variable frequency signal to said base, a variable tap resistor connecting said collector to a source of electrical potential, a serially connected capacitor and resistor connected between the tap of said variable tap resistor and said base of said transistor forming a negative feedback path, and rectifying means connecting said collector to said output through a coupling capacitor.

3. An electronic control circuit for producing a pair of outputs the magnitudes of which are inverse functions of the frequency of a pair of constant amplitude input signals comprising, a pair of similar transistors each having a base, an emitter and a collector, a common electrical line between said transistors, a pair of similar capacitors each connecting one of said bases to said common line, a pair of variable tap resistors each connecting one of said collectors to a source of potential, a pair of similar series resistor-capacitor circuits forming electrical paths each between the variable tap of said variable tap resistor and said base of each transistor, a pair of parallel connected variable tap resistors having each of their junction points in electrical connection with one of said emitters and their variable taps each connected to said common line, a capacitor in series connection with said common line and one of said parallel connected variable tap resistor taps, an input terminal connected to the base of each transistor, and an output terminal connected to the collector of each transistor.

4. In combination with a lock differential, a system for automatically locking out differential action on the occurrence of a predetermined ratio of slip between two wheel drive through the differential, comprising;

means associated with each wheel for transducing wheel speed to an electrical energy signal which is proportional in frequency to wheel speed;

electrical means disposed to receive the electrical energy signals from said transducer means and responsive to produce direct current potential outputs the magnitudes of which are inverse functions of the frequency of the transducer means signals; and means disposed to receive the outputs from said electrical means, and responsive to a difference between the magnitudes of the signals of a predetermined value to lock out differential action between the wheels.

References Cited in the file of this patent

UNITED STATES PATENTS

| | | |
|---|---|---|
| 2,353,554 | Gates | July 11, 1944 |
| 2,401,628 | Eksergian | June 4, 1946 |
| 2,925,559 | De Sautels | Feb. 16, 1960 |
| 2,936,427 | Smith | May 10, 1960 |
| 2,981,852 | MacLean et al. | Apr. 25, 1961 |
| 2,991,373 | Morgan | July 4, 1961 |